US010977291B2

(12) United States Patent
Douthit et al.

(10) Patent No.: US 10,977,291 B2
(45) Date of Patent: Apr. 13, 2021

(54) AUTOMATED DOCUMENT EXTRACTION AND CLASSIFICATION

(71) Applicants: Ronnie Douglas Douthit, Frisco, TX (US); Deepankar Mohapatra, The Colony, TX (US); Ram Mohan Shamanna, Frisco, TX (US); Chiranjeev Jagannadha Reddy, Frisco, TX (US); Yexin Huang, Plano, TX (US); Trichur Shivaramakrishnan Subramanian, McKinney, TX (US); Chinnadurai Duraisami, Plano, TX (US); Karpaga Ganesh Patchirajan, Plano, TX (US); Amar J. Mattey, Frisco, TX (US)

(72) Inventors: Ronnie Douglas Douthit, Frisco, TX (US); Deepankar Mohapatra, The Colony, TX (US); Ram Mohan Shamanna, Frisco, TX (US); Chiranjeev Jagannadha Reddy, Frisco, TX (US); Yexin Huang, Plano, TX (US); Trichur Shivaramakrishnan Subramanian, McKinney, TX (US); Chinnadurai Duraisami, Plano, TX (US); Karpaga Ganesh Patchirajan, Plano, TX (US); Amar J. Mattey, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 365 days.

(21) Appl. No.: 16/054,781

(22) Filed: Aug. 3, 2018

(65) Prior Publication Data
US 2020/0042645 A1  Feb. 6, 2020

(51) Int. Cl.
G06F 7/00 (2006.01)
G06F 16/35 (2019.01)
(Continued)

(52) U.S. Cl.
CPC .......... *G06F 16/353* (2019.01); *G06F 16/93* (2019.01); *G06N 5/02* (2013.01); *G06Q 40/10* (2013.01)

(58) Field of Classification Search
CPC .... G06F 16/353; G06F 16/93; G06F 16/5846; G06F 16/3329; G06F 16/367; G06N 5/02; (Continued)

(56) References Cited

U.S. PATENT DOCUMENTS 9,798,954 B1 * 10/2017 Liu .................... G06K 9/6202
2008/0159622 A1 * 7/2008 Agnihotri ........... G06K 9/4628
382/157

(Continued)

*Primary Examiner* — Azam M Cheema
(74) *Attorney, Agent, or Firm* — Ferguson Braswell Fraser Kubasta PC

(57) ABSTRACT

A method including receiving a source file containing a plurality of documents which, to a computer, initially are indistinguishable from each other. A first classification stage is applied to the source file using a convolutional neural network image classification to identify source documents in the multitude of documents and to produce a partially parsed file having a multitude of identified source documents. The partially parsed file includes sub-images corresponding to the plurality of identified source documents. A second classification stage, including a natural language processing artificial intelligence, is applied to sets of text in bounding boxes of the sub-images, to classify each of the multitude of identified source documents as a corresponding sub-type of document. Each of the sets of text corresponding to one of the sub-images. A parsed file having a multitude of identified sub-types of documents is produced. The parsed file is further computer processed.

22 Claims, 6 Drawing Sheets

(51) Int. Cl.
*G06N 5/02* (2006.01)
*G06Q 40/00* (2012.01)
*G06F 16/93* (2019.01)

(58) Field of Classification Search
CPC ...... G06N 5/04; G06N 5/2355; G06N 3/0454;
G06Q 40/10
See application file for complete search history.

(56) References Cited

U.S. PATENT DOCUMENTS

2008/0232702 A1* 9/2008 Kimoto .................. G16H 30/20
382/232
2014/0244456 A1* 8/2014 Huang ................. G06Q 40/123
705/31

* cited by examiner

FIG. 2   ← 200 System

AUTOMATED DOCUMENT EXTRACTION AND CLASSIFICATION

BACKGROUND

Automated document classification can be an important aspect of modern business processes. For example, a vast number of forms may need to be processed for an ongoing business project. In a more specific example, an accounting firm may receive numerous pages of tax documents in the form of image files or portable document format (PDF) files. Each page may contain multiple tax forms. Each individual form needs to be processed correctly, regardless of where the document appears or what else appears on or near the same page.

Without automated classification using a computer system, a human must view each page and sort the forms according to individual sub-types. Continuing the above example, a human user views a page, isolates the images of different forms contained thereon, and then sends the isolated images for further processing. However, this process is often time consuming and error-prone.

SUMMARY

In general, in one aspect, the invention relates to a method comprising receiving a source file containing a plurality of documents which, to a computer, initially are indistinguishable from each other; applying, by the computer, a first classification stage to the source file using a convolutional neural network image classification to identify source documents in the plurality of documents and to produce a partially parsed file having a plurality of identified source documents, the partially parsed file comprising sub-images corresponding to the plurality of identified source documents; applying, by the computer, a second classification stage, comprising a natural language processing artificial intelligence, to sets of text in bounding boxes of the sub-images, to classify each of the plurality of identified source documents as a corresponding sub-type of document, each of the sets of text corresponding to one of the sub-images, and to produce a parsed file having a plurality of identified sub-types of documents; and using the parsed file for further computer processing.

In general, in one aspect, the invention relates to a non-transitory computer readable storage medium storing instructions for a computer to classify a document, the instructions, when executed by a computer processor, comprising program code for receiving a source file containing a plurality of documents which, to a computer, initially are indistinguishable from each other; program code for applying a first classification stage to the source file using a vision-based convolutional neural network image classification to identify source documents in the plurality of documents, and to produce a partially parsed file having a plurality of identified source documents, the partially parsed file being composed of sub-images corresponding to the plurality of identified source documents; program code for applying a second classification stage, comprising a natural language processing artificial intelligence, to sets of text in bounding boxes of the sub-images, to classify each of the plurality of identified source documents as a corresponding sub-type of document, each of the sets of text corresponding to one of the sub-images, and to produce a parsed file having a plurality of identified sub-types of documents; and program code for using the parsed file for further computer processing.

In general, in one aspect, the invention relates to a system comprising a data storage device comprising a storage medium, the data storage device containing a plurality of source files, each of the plurality of source files having a corresponding plurality of source documents, each of the plurality of source documents having corresponding information; and a computer programmed with a multi-stage classifier comprising: a first classifier configured to identify each of the plurality of source documents as a corresponding plurality of sub-images by applying a vision-based convolutional neural network to each of the plurality of source files, each of the plurality of sub-images corresponding to one of the plurality of source documents, wherein the first classifier is thereby configured to produce a partially parsed file, and a second classifier configured to identify a plurality sub-types of documents by applying a natural language processing artificial intelligence process to the corresponding plurality of sub-images, wherein the second classifier is thereby configured to produce a parsed file having a plurality of identified sub-types of documents having corresponding sets of text, wherein the computer is further programmed with a computer processing service configured to further sort the sub-types of documents into different kinds of sub-types of documents, and then process the sets of text according to the different kinds of sub-types of documents.

Other aspects of the disclosure will be apparent from the following description and the appended claims.

DETAILED DESCRIPTION

Figure 1:
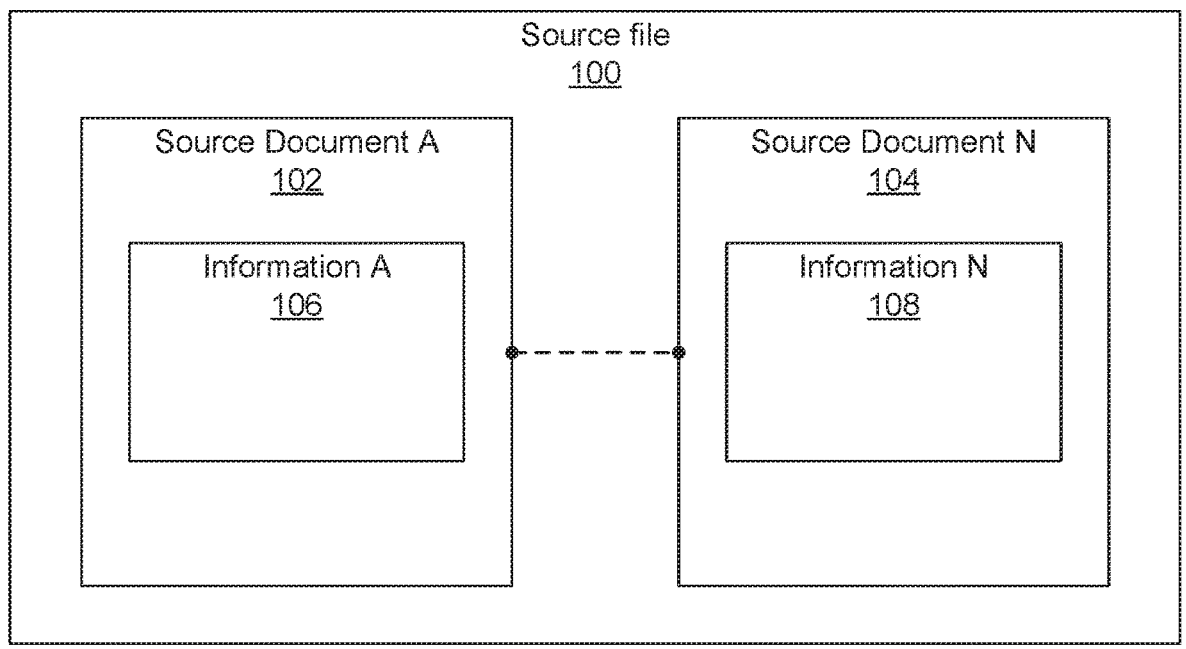
FIG. 1 is a block diagram illustrating a source file having multiple source documents, in accordance with one or more embodiments.

Specific embodiments of the present disclosure will now be described in detail with reference to the accompanying figures. Like elements in the various figures are denoted by like reference numerals for consistency.

In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

The embodiments of the disclosure provide for a technical solution of programming a computer to automatically distinguish multiple forms in a single source file and then perform automatic computerized form processing accordingly. The multiple forms are initially indistinguishable from each other. As used herein, the term "initially indistinguishable from each other" is used in the context of automated computer document processing, and is defined as a computer, using conventional automated form processing, being unable to distinguish and sort multiple different types of forms on a single page or in a single document file. As a non-limiting example of "initially indistinguishable from each other," a computer receives a file containing data that an image viewer or a PDF viewer that can used to display a single page of information. The single page contains three Internal Revenue (IRS) or other tax forms, such as a W-2 form, a 1099 form, and a 1098 form. The computer, in this case, is unable to distinguish the fact that these three forms are different from each other, and is unable to sort the forms or process them differently. A trained human could distinguish these forms with a glance at the page; however, the one or more embodiments of the disclosure are concerned only with programming a computer to automatically distinguish these three forms, and then process them according to their respective form types.

Many other examples are contemplated, such as more or fewer forms, different types of forms, more or fewer file and data types, etc. Further, the one or more embodiments are not limited to tax forms. Moreover, the following is a summary of one or more embodiments of the disclosure. This summary does not necessarily limit the claims, nor the other examples described with respect to the following figures.

The one or more embodiments of the disclosure provide for an artificial intelligence-based (or machine learning) solution for automated document classification that uses a cascade of classifiers to automatically identify and extract documents from images or PDFs. Thus, the one or more embodiments of the disclosure provide for a multi-stage classification system.

In one embodiment, the first stage classifier uses a computer vision-based convolutional neural network to find a bounding rectangle of forms or receipts within an image or video. This approach allows multiple documents to be identified within the same image or within frames of a video. The image classifier artificial intelligence identifies one or more bounding rectangles within the image and the type of document (such as a form or receipt). Given those results, the system extracts the sub-image within the bounding rectangle and uses a technique, such as optical character recognition (OCR) to extract the text. As used herein, the term "text" is defined as one or more alphanumeric characters arranged into strings (i.e., "words", "numbers", "letters", "special characters", or combinations thereof). The text is then fed to a natural language processing artificial intelligence capable of classifying the document as a specific form type, such as (but not limited to) a W2 form, a 1099-INT form, a 1098-T form, etc. Once classified, the image is then sent to a computerized software service where the form fields can be extracted based on the form type. Those extracted fields are then imported (as necessary) into a computerized software service.

Thus, in one or more embodiments of the disclosure, a relatively weak first stage classifier is used that, initially, does not attempt to differentiate the specific sub-type of forms on a page. This first classifier is programmed to distinguish only general form types, such as to recognize the difference between a tax form, a purchase receipt, or other unrelated objects/documents; however, the first classifier does not distinguish form sub-type within these general types.

One or more embodiments of the disclosure then use a domain specific natural language processing-based classifier (NLP classifier) in a second classification stage. The NLP classifier understands the tax vocabulary instead of statistical incidence of words.

In accordance with one or more embodiments of the disclosure, this combination and cascade of classifiers and classification stages is powerful and accurate in that this combination supports automatic classification and processing of multiple documents within the same image. This combination is also robust enough to handle many different form layouts without retraining the artificial intelligence algorithms used during either stage of classification.

Others have attempted to classify forms based on OCR and text. However, the classification used by embodiments of the disclosure works with multiple documents existing on the same page. Because the computer can determine the sub-types of forms, the computer is able to determine which information to send to what processing service. In addition, this solution allows for domain specificity. For example, in the approach described herein, words like "wages" and "rent" have elevated meaning over words not specific to the domain the computer is programmed to detect.

Another approach some have attempted is classifying based on image detection. With the solution of the present invention, no need for different organizations to allow different individuals or groups to create their own template for a given form type exists. Thus, for example, it will not matter if the layout for two different W-2 tax forms look very different from one another. Subsequent OCR processing will now be sufficient because words or text will be associated with the correct individual forms on a page.

FIG. 1 is a block diagram illustrating a source file having multiple source documents, in accordance with one or more embodiments. Source file 100 is an example of a source file which contains many source documents, such as source document A 102 through source document N 104. Each source document contains information (e.g., analog or digital data as processed, stored, or transmitted by a computer, etc.) that is specific to a category of information. For example, source document A 102 contains information A 106 and source document N 104 contains information N 108. Intervening source documents may contain similar information.

Source file 100 may be, when displayed, a single page of information or multiple pages of information. Source file 100 may have a variety of different data structures, such as an image file, a portable document format (PDF) file, a video file, or other types of computer files capable of being rendered on a physical display or printed by a physical printer or output device.

Initially, a computer cannot distinguish the fact that source document A 102 is different than source document N 104, or any other source document. Thus, initially, a computer is unable to treat information A 106 as being different from information N 108, or any other information in any source document. Thus, initially, a computer is unable to reliably process information A 106 in a manner different than information N 108. One or more embodiments of the disclosure provide for techniques for addressing this issue, and are described in more detail with respect to FIG. 2 through FIG. 5.

Figure 2:
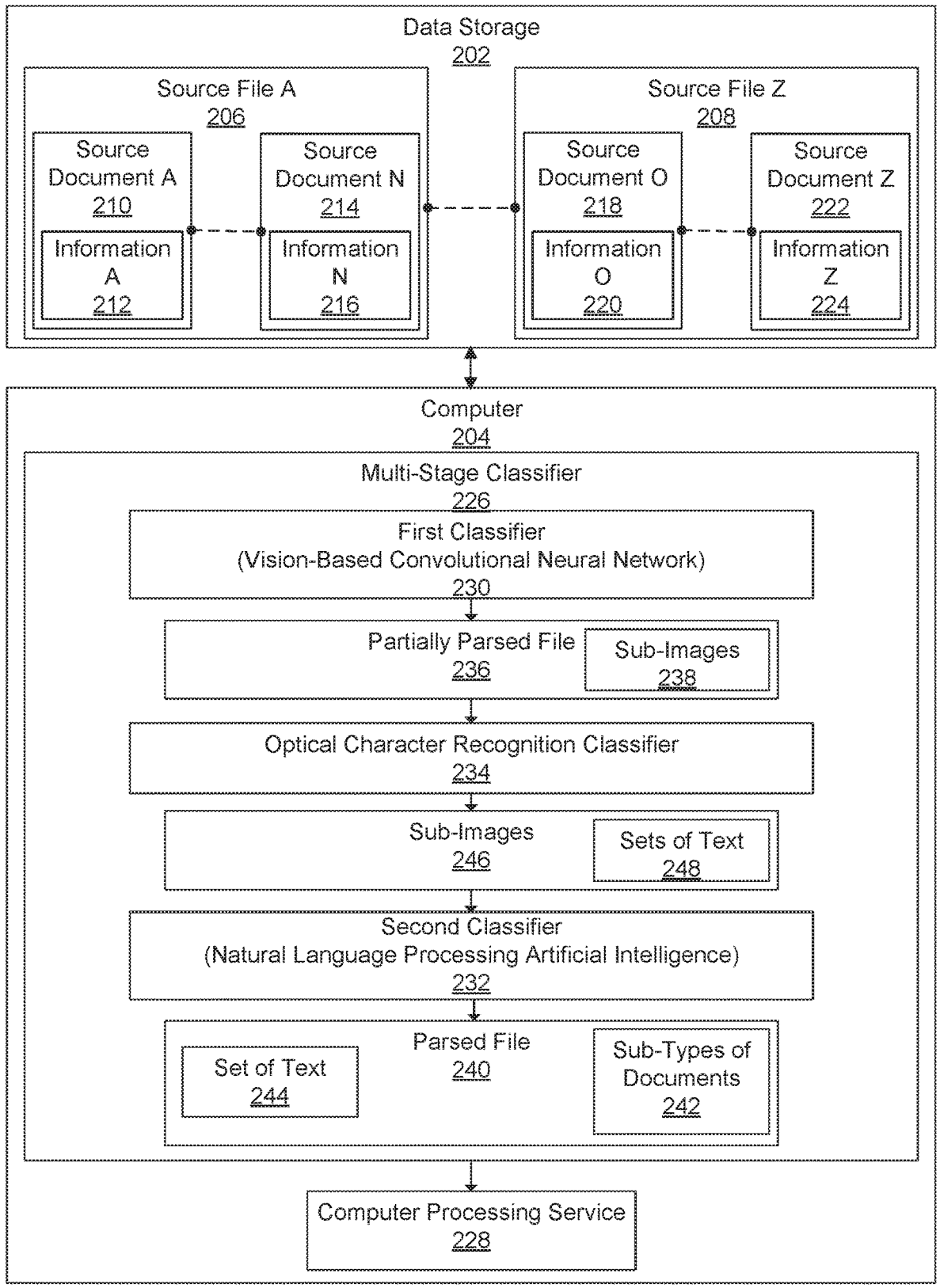
FIG. 2 is a block diagram illustrating a multi-stage classification system, in accordance with one or more embodiments.

FIG. 2 is a block diagram illustrating a multi-stage classification system, in accordance with one or more embodiments. System 200 is an example of a system that can successfully process source file 100 of FIG. 1, distinguishing between source document A 102 from source document N 104 and, processing their respective information differently and accurately.

System 200 includes data storage 202 and computer 204. In one or more embodiments, data storage 202 is a non-transitory computer readable storage medium, such as described with respect to FIG. 6A and FIG. 6B. Computer 204 includes a processor and accompanying hardware necessary to automatically process data, such as described with respect to FIG. 6A and FIG. 6B.

Figure 5:
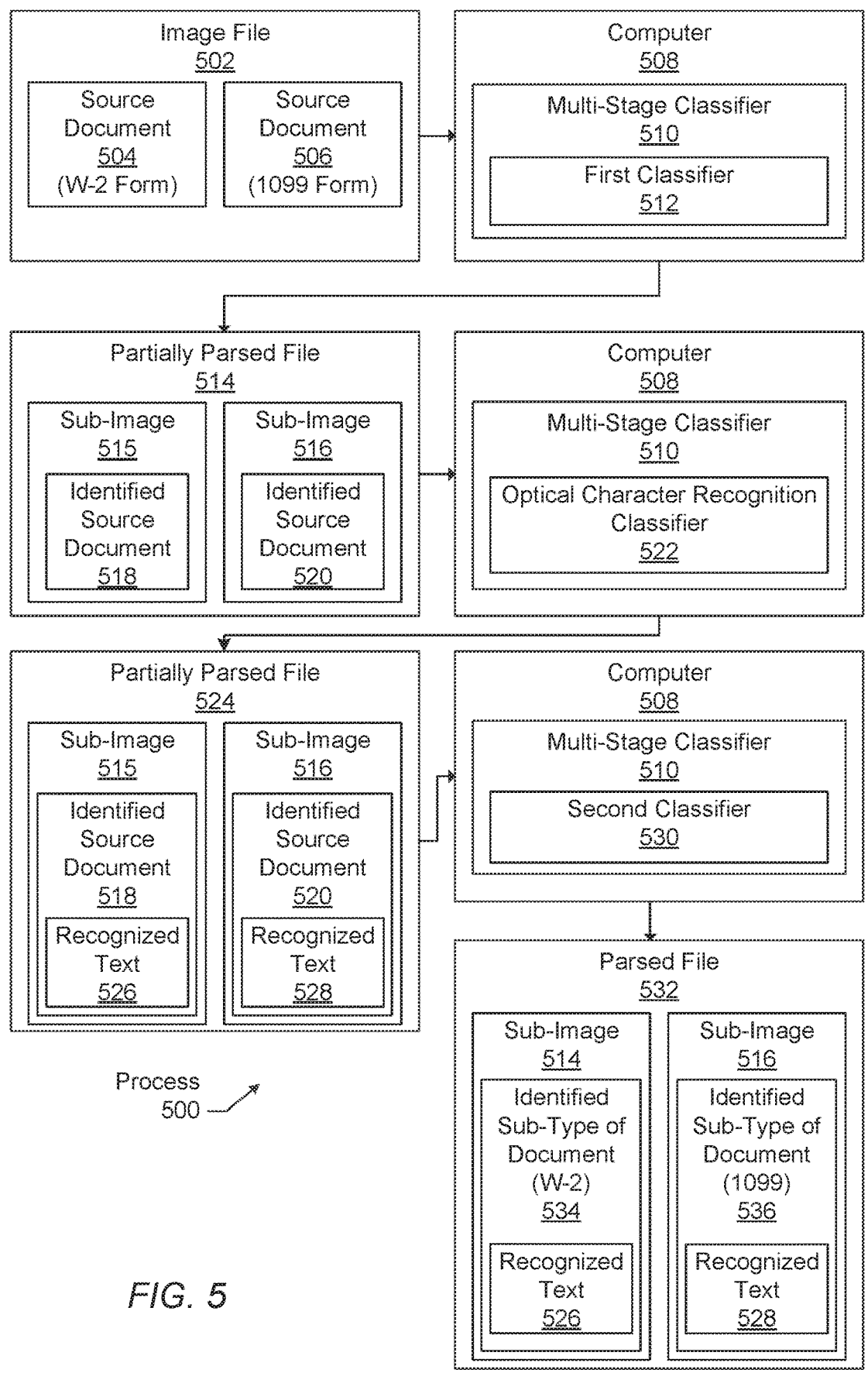
FIG. 5 is a block diagram illustrating another example of multi-stage document classification of a source file having multiple documents, in accordance with one or more embodiments.

Data storage 202 contains one or more source files, such as source file A 206 through source file Z 208 in accordance with one or more embodiments. Each source file may have multiple documents contained therein that are initially indistinguishable by computer 204, including by conventional image processing techniques. Thus, for example, source file A 206 may contain source document A 210 containing information A 212, through source document N 214 containing information N 216. Likewise, source file Z 208 may contain source document O 218 containing information O 220 through source document Z 222 containing information Z 224. Specific examples of such source files and source documents are shown in FIG. 5.

Continuing with FIG. 2, data storage 202 may contain other source files having similar data structures. As described above, each source file may be of different types, including but not limited to image, PDF, and video files. Data storage 202 may contain multiple different types of source files and have different data architectures, all of which are to be processed automatically by computer 204.

Computer 204 includes a multi-stage classifier 226. Computer 204 optionally may also include a computer processing service 228, which is a software program configured to process automatically the various forms of information (such as information A 212 and others) according to the determined type of source document (such as source document A 210 and others) in accordance with one or more embodiments of the invention. In a non-limiting example, computer processing service 228 may be an automated tax processing algorithm which processes information from W-2 forms, though many different types of algorithms are contemplated.

Note that the computer processing service 228 may be external to computer 204 and may communicate with computer 204 over a network. More than one computer processing service 228 may be present to process each of the different types of information in data storage 202. Computer processing service 228 may also execute on computer 204 itself.

Attention is now turned to the multi-stage classifier 226. The multi-stage classifier 226 includes a first classifier 230 and a second classifier 232 in accordance with one on more embodiments of the invention.

The first classifier 230 is a convolutional neural network (CNN), such as a vision-based CNN, which is described in detail below. However, in accordance of one or more embodiments of the invention, another type of vision-based artificial algorithm could be used, such as a Haar Cascade Classifier, to detect objects within digital images using the intuitive similarity with Haar wavelets.

In one or more embodiments, the first classifier 230 is programmed to distinguish different source documents from each other within a single source file, but not to perform any other processing on a given source file. Thus, for example, the first classifier 230 is programmed to analyze source file A 206 and determine that this source file contains source document A 210 through source document N 214, but not to perform other types of processing on source file 206.

As shown in FIG. 2, the first classifier 230 may then distinguish source document A 210 through source document N 214 using a variety of different techniques. For example, the first classifier 230 may cause a bounding box to be drawn around each of source document A 210 through source document N 214. In another example, the first classifier 230 may extract source document A 210 through source document N 214, save them as different files, and sort the extracted document files according to their form types. In another example, the first classifier 230 may associate fields of text or other types of data in information A 212 through information N 216 with an identifier such that all fields or other types of data having the same identifier are associated with the corresponding particular source document. Other techniques for distinguishing the different source documents from each other are contemplated, though in some manner the output of the first classifier 230 is a data structure which the computer 204 can read to distinguish that a given set of information is associated with a given corresponding source document.

However, at this point, the computer 204 is still unable to distinguish the sub-types of information. For example, at this point, the computer 204 is unable to distinguish information A 212 as relating to a "W-2" form and information N 216 as relating a "1099" form, and thus, at this point, the computer 204 is unable to distinguish source document A 210 as being the W-2 and source document N 214 as being the 1099. Nevertheless, the computer 204 can now distinguish that source document A 210 through source document N 214 are all different source documents within source file A 206. The first classifier 230 may perform a similar process on source file Z 208 and its source documents.

The first classifier 230, therefore, may take as input a source file, such as source file A 206, and may return as output a partially parsed file 236 containing sub-images 238. In one or more embodiments, the partially parsed file 236 is described as "partially parsed" because the output of the first classifier 230 is a first stage classification, and accordingly is only part of the processing performed by the multi-stage classifier 226. Sub-images 238 correspond to each of the now distinguished sub documents within a given source file. Sub-images 238 may have bounding boxes drawn around them in some embodiments.

In one or more embodiments, sub-images 238 instead correspond to a form identifier and its associated information or to an individual extracted image, according to the embodiments described above. Thus, in accordance with one or more embodiments, the use of the term "sub-images" does not necessarily limit other variations of the programmed output of the first classifier 230, as described above. For example, if a different classification output scheme is contemplated (such as data extraction, image extraction, or identification of fields within the source file), then sub-images 238 would be replaced by corresponding data structures within the partially parsed file 236.

Attention is now turned to the second classifier 232 as shown in FIG. 2. In one or more embodiments, the second classifier 232 is a natural language processing artificial intelligence (NLP) algorithm, which is described below. Note that some source files may have text recognizable by the computer 204; therefore, the optical character recognition classifier 234 (described below) is not necessarily needed in a given situation. For purposes of describing the operation of the second classifier 232, it is assumed that the partially parsed file 236 contains computer-recognizable text, and that the computer 204 is now capable of distinguishing one source document from another using the partially parsed file 236.

In one or more embodiments, the second classifier 232 applies a NLP algorithm, individually, to each identified source document within a source file. Thus, for example, the second classifier 232 applies a NLP algorithm to the source document A 210, to the source document N 214, and to every other source document within the source file A 206. Because information A 212 through information N 216 contains computer-recognizable text, the second classifier 232 is able to read this information and, for each source document, use the NLP artificial intelligence algorithm to determine the sub-type of a given source document. Thereafter, the computer 204 can process (or order the processing of) the corresponding information within a source document according to the sub-type of the source document.

For example, assume that source document A 210 is a W-2 form. Before the second classifier 232 is applied, the computer 204 does not recognize source document A 210 as a W-2 form, and thus does not know which computer processing service should process information A 212 in this form. However, the second classifier 232 performs a NLP algorithm, using information A 212 in source document A 210 as input. As output, the NLP algorithm determines, based on the words, phrases, and other alphanumeric text used in information A 212, that source document A 210 is, in fact, a W-2 form. The second classifier 232 then labels source document A 210 as a W-2 form. Accordingly, the computer 204 can now use rule or policies to cause information A 212 in source document A 210 to be processed by the computer processing service 228 which, in this particular example only, is an algorithm meant to process information specific to W-2 forms.

Thus, in one or more embodiments, the output of the second classifier 232 is the parsed file 240 containing sub-types of documents 242. The term "parsed file" is now used, because the result of the second classifier 232 is a data structure containing sufficient information to allow the computer 204 to distinguish different source documents within a specific source file and also to associate each source document with a sub-type of document; additionally, the data structure includes computer-recognizable alphanumeric text useable by the computer processing service 228 or some other computer processing service.

Thus, each of sub-types of documents 242 contains a corresponding set of text 244, which corresponds to a specific source document in accordance with one or more embodiments. In a non-limiting embodiment, one sub-type of document (242) may be source document A 210 (now identified as being a specific sub-type of document) containing information A 212 (which in this case is set of text 244).

This process can be repeated for all of the source documents within the data storage 202 in accordance with one or more embodiments. In this manner, the computer 204 can be programmed to recognize many different sub-types of forms within a given source file and have the information contained therein processed by different computer processing services according to their sub-types.

Continuing with FIG. 2, attention is now turned to the optional optical character recognition classifier 234. In one or more embodiments, the optical character recognition classifier 234 is described as optional because, as indicated above, the partially parsed file 236 may already contain recognizable text. However, when the unprocessed sub-images 238 remain, or otherwise do not contain computer-recognizable text, the multi-stage classifier 226 may include the optical character recognition classifier 234, which could be characterized as a third classifier in the multi-stage classifier 226. In one non-limiting example, the input of the optical character recognition classifier 234 is the partially parsed file 236. The output of the optical character recognition classifier 234 is a data structure containing data for rendering or printing sub-images 246 having corresponding sets of text 248. Thus, sub-images 246 with sets of text 248 now can be processed by the second classifier 232 according to a natural language processing artificial intelligence algorithm.

In the above example, the optical character recognition classifier 234 is shown as being between the first classifier 230 and the second classifier 232. However, the optical character recognition classifier 234 could be programmed for execution on a source file before the first classifier 230 is applied to a source file.

Attention is now turned to details regarding the artificial intelligence algorithms described above. In particular, continuing with FIG. 2, attention is now turned to the CNN. In one or more embodiments, the CNN is vision-based and includes the necessary functionality to identify documents within images.

In one or more embodiments, the CNN may take as input a source file, such as source file A 206, and analyze the image shown in source file A 206 in FIG. 2. Specifically, the CNN is trained to detect certain classes of documents by recognizing what a generic type of document looks like within the image.

By analyzing the image, the CNN can recognize patterns within the image such that areas within the image are related to each other. Specifically, patterns in the image indicate that, for example, a given portion of the image relates to a common thing, such as source document A 210. Thus, the CNN does not actually answer the question "what is source document A", but does determine that "source document A" is a sub-image that should be treated as a unit. Thus, as described above, the CNN is programmed to distinguish only general form types, such as to recognize the difference between a tax form, a purchase receipt, or other unrelated objects/documents; however, the CNN does not distinguish form sub-type within these general types. Attention is now turned to the operational details of a CNN.

In machine learning, a convolutional neural network (CNN or ConvNet) is a class of deep, feed-forward artificial neural networks, most commonly applied to analyzing visual imagery. CNNs use a variation of multilayer perceptrons designed to require minimal preprocessing. CNNs are also known as shift invariant or space invariant artificial neural networks (SIANN), based on its shared-weights architecture and translation invariance characteristics. CNNs use relatively little pre-processing compared to other image classification algorithms. This feature means that the network learns the filters that in traditional algorithms were hand-engineered.

A CNN typically includes an input and an output layer, as well as multiple hidden layers. The hidden layers of a CNN typically include convolutional layers, pooling layers, fully connected layers, and normalization layers. For purposes of the embodiments described herein, the input layer takes as input the image file.

Description of the process as a convolution in neural networks is by convention. Mathematically, it is a cross-correlation rather than a convolution. This fact only has significance for the indices in the matrix, and thus which weights are placed at which index.

Convolutional layers apply a convolution operation to the input, passing the result to the next layer. The convolution emulates the response of an individual neuron to visual stimuli. Each convolutional neuron processes data only for its receptive field. Convolutional networks may include local or global pooling layers, which combine the outputs of neuron clusters at one layer into a single neuron in the next layer. For example, max pooling uses the maximum value from each of a cluster of neurons at the prior layer. Another example is average pooling, which uses the average value from each of a cluster of neurons at the prior layer.

Fully connected layers connect every neuron in one layer to every neuron in another layer. It is, in principle, the same as the traditional multi-layer perceptron neural network (MLP). CNNs share weights in convolutional layers, which means that the same filter (weights bank) is used for each receptive field in the layer. This feature reduces memory footprint and improves performance. Thus, a CNN architecture is formed by a stack of distinct layers that transform the input volume into an output volume (e.g. holding the class scores) through a differentiable function. A few distinct types of layers are commonly used.

Neurons of a convolutional layer are connected to their receptive fields. The convolutional layer is the core building block of a CNN. The layer's parameters include of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

When dealing with high-dimensional inputs such as images, including a source file, such as source file A 206 in FIG. 2, it may be impractical to connect neurons to all neurons in the previous volume because such a network architecture does not take the spatial structure of the data into account. However, convolutional networks exploit spatially local correlation by enforcing a local connectivity pattern between neurons of adjacent layers: each neuron is connected to only a small region of the input volume. The extent of this connectivity is a hyperparameter called the receptive field of the neuron. The connections are local in space (along width and height), but always extend along the entire depth of the input volume. Such an architecture ensures that the learnt filters produce the strongest response to a spatially local input pattern.

Three hyperparameters control the size of the output volume of the convolutional layer: the depth, stride, and zero-padding. The depth of the output volume controls the number of neurons in a layer that connect to the same region of the input volume. These neurons learn to activate for different features in the input. For example, if the first convolutional layer takes the raw image as input, then different neurons along the depth dimension may activate in the presence of various oriented edges, or blobs of color.

Stride controls how depth columns around the spatial dimensions (width and height) are allocated. When the stride is one then the filters are moved one pixel at a time. This setting leads to heavily overlapping receptive fields between the columns, and also to large output volumes. When the stride is two (or rarely three or more) then the filters jump two pixels at a time as they slide around. The receptive fields overlap less, and the resulting output volume has smaller spatial dimensions. Sometimes it is convenient to pad the input with zeros on the border of the input volume. The size of this padding is a third hyperparameter. Padding provides control of the output volume spatial size. In particular, sometimes it is desirable to exactly preserve the spatial size of the input volume.

The spatial size of the output volume can be computed as a function of the input volume size, W, the kernel field size of the Cony Layer neurons, K, the stride with which they are applied, S, and the amount of zero padding, P, used on the border. The formula for calculating how many neurons "fit" in a given volume is given by $(W-K+2P)/S+1$. If this number is not an integer, then the strides are set incorrectly and the neurons cannot be tiled to fit across the input volume in a symmetric way. In general, setting zero padding to be $P=(K-1)/2$ when the stride is $S=1$ ensures that the input volume and output volume will have the same size spatially. Though it's generally not completely necessary to use up all of the neurons of the previous layer, for example, one may decide to use just a portion of padding.

A parameter sharing scheme is used in convolutional layers to control the number of free parameters. It relies on one reasonable assumption: That if a patch feature is useful to compute at some spatial position, then it should also be useful to compute at other positions. In other words, denoting a single 2-dimensional slice of depth as a depth slice, one can constrain the neurons in each depth slice to use the same weights and bias. Since all neurons in a single depth slice share the same parameters, then the forward pass in each depth slice of the convolutional layer can be computed as a convolution of the neuron's weights with the input volume (hence the name: convolutional layer). Therefore, it is common to refer to the sets of weights as a filter (or a kernel), which is convolved with the input. The result of this convolution is an activation map, and the set of activation maps for each different filter are stacked together along the depth dimension to produce the output volume. Parameter sharing contributes to the translation invariance of the CNN architecture.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum. The intuition is that the exact location of a feature is less important than its rough location relative to other features. The pooling layer serves to progressively reduce the spatial size of the representation, to reduce the number of parameters and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of two downsamples at every depth slice in the input by two along both width and height, discarding 75% of the activations. In this case, every max operation is over four numbers. The depth dimension remains unchanged.

A CNN also includes a rectified linear unit layer containing rectified linear units. This layer applies the non-saturating activation function f(x)=max(0,x). It increases the non-linear properties of the decision function and of the overall network without affecting the receptive fields of the convolution layer. Other functions can also be used to increase nonlinearity. After several convolutional and max pooling layers, the high-level reasoning in the neural network is done via fully connected layers. Neurons in a fully connected layer have connections to all activations in the previous layer, as seen in regular neural networks. Their activations can hence be computed with a matrix multiplication followed by a bias offset.

The loss layer specifies how training penalizes the deviation between the predicted and true labels and is normally the final layer. Various loss functions appropriate for different tasks may be used there. Softmax loss is used for predicting a single class of K mutually exclusive classes. Sigmoid cross-entropy loss is used for predicting K independent probability values in [0,1]. Euclidean loss is used for regressing to real-valued labels of plus and minus infinity.

Attention is now turned to natural language processing artificial intelligence algorithms, such as that used in the second classifier 232 in FIG. 2. Natural Language Processing (NLP) refers to an artificial intelligence method of communicating with a computer using a natural language such as English or any other human language. Processing of natural language is useful when a computer is to parse and analyze text in a source document is in order to determine to which sub-type a document belongs.

Thus, for purposes of the one or more embodiments, a NLP algorithm analyzes text for patterns to which a computer can then apply classification policies or rules (within the NLP or external to the NLP). In a specific example, a NLP algorithm can be used to instruct a computer that the phrase "see Spot run" is a sentence. Further, the NLP algorithm or other rules or policies executed by the computer, can be used to program the computer that this sentence has meaning: for example, an individual (the implied "you" of the sentence) is instructed to observe (see) the creature (Spot) perform the activity (run).

In a similar manner, a NLP artificial intelligence algorithm can be applied to text within sub-images 238 or to sets of text 248 in sub-images 246 of FIG. 2. In a non-limiting example, the NLP artificial intelligence algorithm can recognize the text string "total wages" followed by a special character "$" and a number "36,257" and recognize that there is an association between the phrase "total wages" the special character "$" and the number "36,257". The computer is instructed to recognize meaning: the person to whom this form applies earned 36,257 dollars in a year.

More importantly, for purposes of the one or more embodiments, the computer is instructed that this phrase, or one similar to it, is commonly used in W-2 forms. The computer also recognizes other elements of a W-2 form such as the string "federal taxes withheld" followed by the special character "$" and the number "9,064.25". Not only is the computer instructed as to the meaning of this phrase, but also that two phrases ("total wages" and "federal taxes withheld") that commonly appear in W-2 forms are present within the sub-image. The higher the number of phrases common to W-2 forms that appear in the sub-image, the higher the probability that the identified source document (sub-image) is, indeed, a W-2 form. Thus, if ten such phrases appear in the source document (sub-image), then the computer can determine to a high degree of confidence that the source document (sub-image) being analyzed actually is a W-2 form. The information from this sub-document (sub-image) can then be processed accordingly in a manner intended to be specific to W-2 forms by the computer processing service 228.

Attention is now turned to the details of a natural language processing (NLP) artificial intelligence. There are several different stages of NLP. These include a lexical analysis, a syntactic analysis, a semantic analysis, a discourse integration, and a pragmatic analysis. A lexical analysis involves identifying and analyzing the structure of words. A lexicon is the collection of words and phrases in a language. Lexical analysis is dividing the whole chunk of text into paragraphs, sentences, and words. A syntactic analysis involves analysis of words in the sentence for grammar, and arranging words in a manner that shows the relationship among the words. A non-sensical sentence such as "Dust to the alpha house Greek" is rejected by an English syntactic analyzer. This analysis can be performed by a computer using a parse tree, which parses strings of text according to parts of speech (noun, verb, adjective article, adverb, etc.). A semantic analysis draws the exact meaning or the dictionary meaning from the text. The text is checked for meaningfulness. This check may be performed by mapping syntactic structures and objects in the task domain. The semantic analyzer disregards phrases that appear meaningless, such as "evil goodness".

Discourse integration analyses the meaning of sentences before and after a sentence being analyzed, and checks for continuing meaning. For example, the meaning of a sentence may depend upon the meaning of the sentence just before it. Non-sequitur sentences, such as "the flag flies" followed by "the cow jumps over the moon" may trigger an alarm or cause a particular analysis to be rejected. In addition, discourse integration also analyzes a current sentence for influence on the meaning of immediately succeeding sentence.

During pragmatic analysis the NLP algorithm analyzes what was said and re-interprets what was said to what is meant. This analysis involves deriving those aspects of language which require real-world knowledge. For example, pragmatic analysis may be used to analyze the true meaning of colloquialisms. For example, if the sentence "it is raining cats and dogs" appears, pragmatic analysis can be used to recognize that the true meaning of this sentence is that "it is raining heavily", as opposed to meaning actual animals falling out of the sky.

Thus, a NLP artificial intelligence algorithm is capable of not only recognizing language, but its meaning. It is for this reason that the second classifier 232 is capable of analyzing text from, for example, information A 212, and determining that source document A 210 is a W-2 form. Thus, the second classifier 232 is programmed to identify and assign identities to sub-types of source documents within a source file.

The various components of system 200 may be implemented on computer 204, or may be distributed among multiple computers. For example, computer processing service 228, first classifier 230, second classifier 232, and optical character recognition classifier 234 may be distributed among multiple computers in addition to computer 204. For this reason, computer 204 may be interpreted as being multiple computers in a distributed computing environment, for example, as shown and described in relation to FIG. 6A and FIG. 6B.

Figure 3:
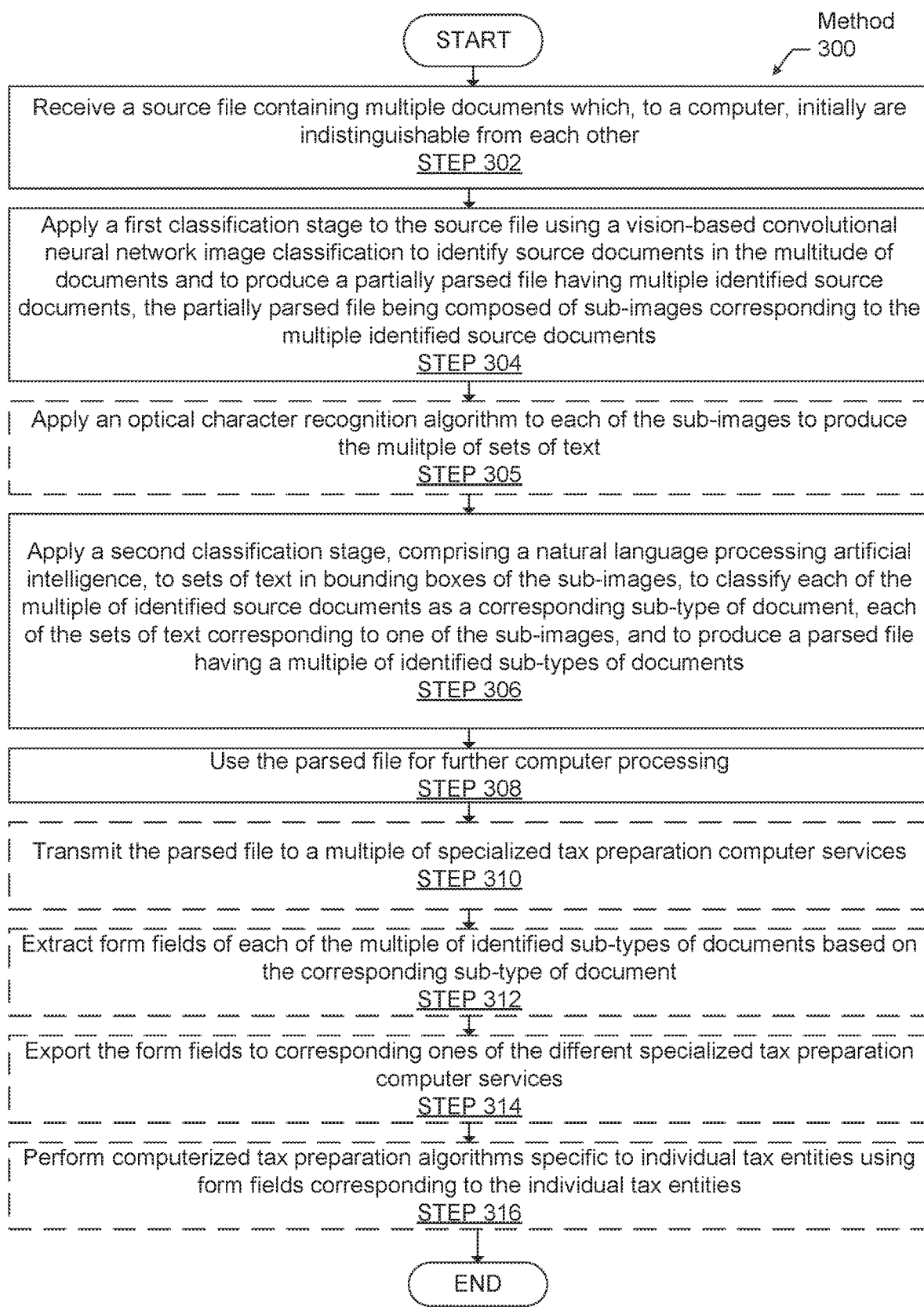
FIG. 3 is a flowchart diagram of a method for automated document classification, in accordance with one or more embodiments.

FIG. 3 is a flowchart diagram of a method for automated document classification, in accordance with one or more embodiments. Method 300 may be executed using a multi-stage classification system, such as system 200 of FIG. 2. Method 300 may also be executed or implemented using a computer, possibly by a remote server, such as the computer shown in FIG. 6A and FIG. 6B. Method 300 may be used to process a source file, such as source file 100 shown in FIG. 1. Optional operations in method 300 are shown with dashed boxes in FIG. 3.

Method 300 starts by a computer receiving a source file containing multiple documents which, to a computer, initially are indistinguishable from each other (STEP 302). Next, the computer applies a first classification stage to the source file using a vision-based convolutional neural network image classification in order to identify source documents in the multiple documents and to produce a partially parsed file having multiple identified source documents, the partially parsed file being composed of sub-images corresponding to the multiple identified source documents (STEP 304).

Next, the computer applies a second classification stage, including a natural language processing artificial intelligence, to sets of text in bounding boxes of the sub-images, in order to classify each of the multiple identified source documents as a corresponding sub-type of document, each of the sets of text corresponding to one of the sub-images, and in order to produce a parsed file having multiple identified sub-types of documents (STEP 306). Finally, the computer uses the parsed file for further computer processing (STEP 308). In one embodiment, the method terminates thereafter.

Method 300 may be varied. For example, optionally, method 300 may also optionally include, after applying the first classification stage, but before applying the second classification stage, applying an optical character recognition algorithm to each of the sub-images to produce the multiple sets of text (STEP 305). In another variation, method 300 may also optionally include transmitting the parsed file to multiple specialized tax preparation computer services (STEP 310). In this case, method 300 may also optionally include extracting form fields of each of the multiple identified sub-types of documents based on the corresponding sub-type of document (STEP 312). Still further, method 300 may then optionally include exporting the form fields to corresponding ones of the different specialized tax preparation computer services (STEP 314). Further yet, method 300 may then optionally include performing computerized tax preparation algorithms specific to individual tax entities using form fields corresponding to the individual tax entities (STEP 316).

Still other variations are possible. For example, in an embodiment, using the parsed file for further computer processing includes transmitting the parsed file to another algorithm executing on the computer. In another embodiment, using the parsed file for further computer processing includes performing, by the computer, at least one of storing the parsed file on a non-transitory computer readable storage medium, displaying the parsed file, and transmitting the parsed file to another computer.

In still another an embodiment, the source file includes an image and or a portable document file. In yet another embodiment, an additional steps may include applying the bounding boxes around the sub-images formed at STEP 304.

Yet other variations are possible. Thus, the examples described with respect to FIG. 3 do not necessarily limit the claims or the other examples described herein.

Figure 4:
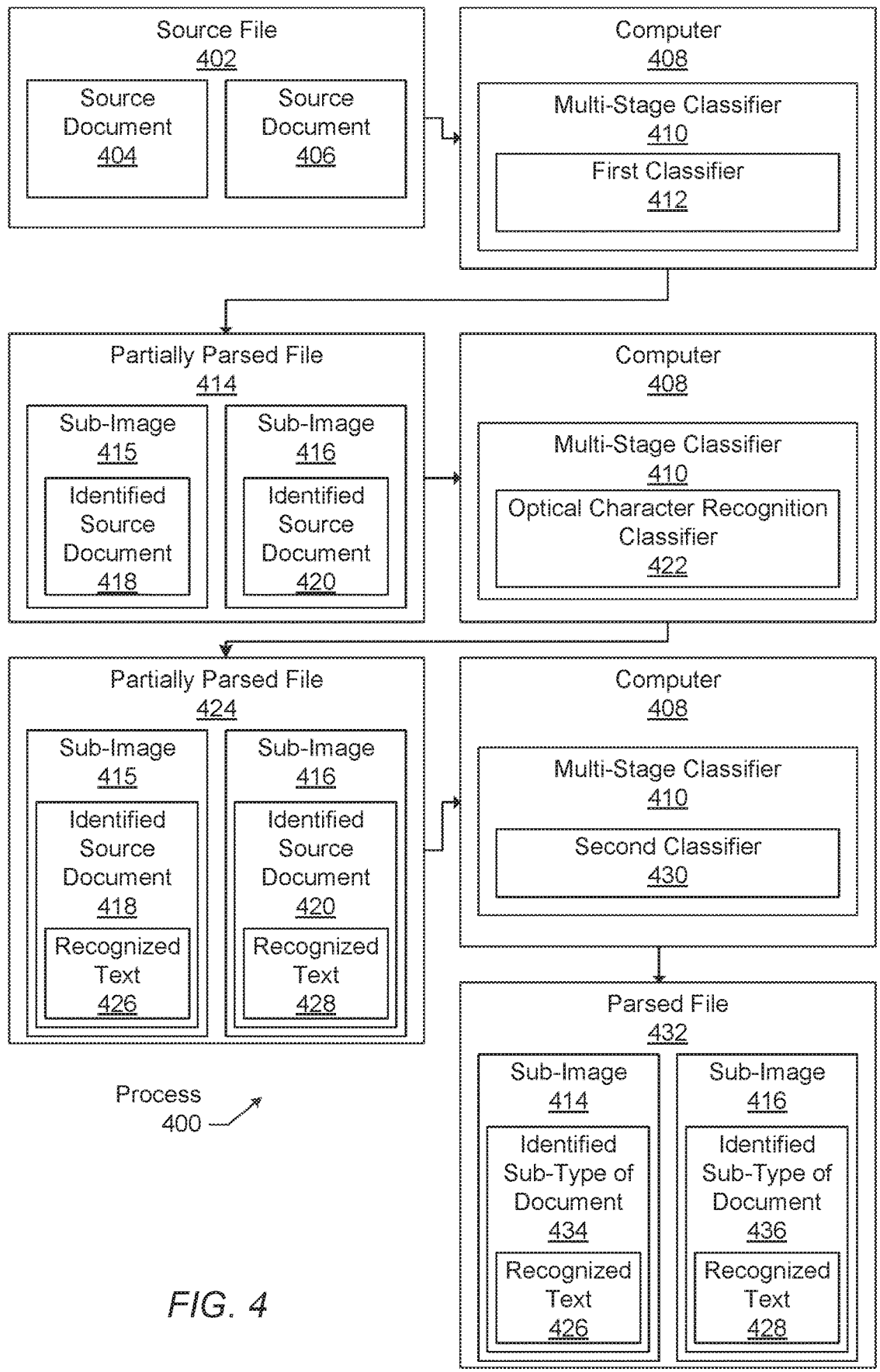
FIG. 4 is a block diagram illustrating an example of multi-stage document classification of a source file having multiple documents, in accordance with one or more embodiments.

FIG. 4 is a block diagram illustrating an example of multi-stage document classification of a source file having multiple documents, in accordance with one or more embodiments. Process 400 is a variation of method 300 of FIG. 3. Process 400 may be implemented by system 200 of FIG. 2. Process 400 may take as input source file 100 of FIG. 1. Process 400 is a specific example to aid in understanding the one or more embodiments of the present disclosure, and thus does not necessarily limit the claims or the other embodiments disclosed herein.

Process 400 starts with taking the source file 402 as input. The source file 402 contains two source documents, namely source document 404 and source document 406. Initially, these two source documents are indistinguishable by a computer, such as a computer 408.

The computer 408 is programmed with a multi-stage classifier 410, such as the multi-stage classifier 226 of FIG. 2. The multi-stage classifier 410 includes first classifier 412, which may be a convolutional neural network, as described above. The first classifier 412 analyzes the source file 402 and distinguishes source document 404 from source document 406. Thus, the first classifier 412 distinguishes between different documents, but does not identify or further classify these source documents.

The output of the first classifier 412 is the partially parsed filed 414. The partially parsed file 414 contains sub-image 416 (corresponding to source document 404) and sub-image 416 (corresponding to source document 406). Sub-image 415 contains identified source document 418 and sub-image 416 contains identified source document 420. An "identified source document" is, again, an area in an image, PDF, or video file (or some other file) which the computer recognizes contains a discrete, related set of information. In this particular example, each sub-image is an image or PDF that contains unrecognized text; that is, the computer cannot yet read or recognize text that a human would recognize within the sub-image.

Thus, in this example, the computer 408 then uses the multi-stage classifier 410 to perform another stage of classification using the optical character recognition classifier 422. The optical character recognition classifier 422 takes as input the partially parsed file 414 and performs optical character recognition on sub-image 415 and sub-image 416. The output of optical character recognition classifier 422 is the partially parsed file 424. The partially parsed file 424 still has sub-image 415 with identified source document 418, but now also contains recognized text 426, which a computer can analyze as text. Likewise, the partially parsed file 424 has sub-image 416 with identified source document 420, but now also contains recognized text 428, which a computer can analyze as text.

The computer 408 then uses a multi-stage classifier 410 to perform a second stage of classification using a second classifier 430. Note that in other embodiments the second classifier 430 could be recharacterized as a third classifier, with an optical character recognition classifier 422 being characterized as the second classifier. However, for purposes of this example, second classifier 430 takes as input the partially parsed file 424 and performs a natural language processing (NLP) artificial intelligence algorithm in order to identify and label the types of identified source documents present in the partially parsed file 424. This NLP algorithm may be applied separately to each identified source document in order to increase the probability of correctly classifying a given source document.

The output of the second classifier 430 is parsed file 432. Parsed file likewise contains sub-image 415 and sub-image 416. However, now sub-image 415 is labeled and classified as identified sub-type of document 434, which corresponds to identified source document 418. Identified sub-type of document 434 retains recognized text 426. Likewise, sub-image 416 is labeled and classified as identified sub-type of document 436, which corresponds to identified source document 420. Identified sub-type of document 436 retains recognized text 428.

At this point, the parsed file 432 is ready for further processing by other algorithms or processes. For example, the parsed file 432 (or just parts of parsed file 432) may be provided to two different algorithms, one specialized for processing identified sub-type of document 434 and the other specialized for processing identified sub-type of document 436. The parsed file 432 may be transmitted to external computers for further processing, or may be further processed within the computer which performs process 400. The parsed file 432 may also be stored on a non-transitory computer readable storage medium. The parsed file may also be transmitted via email or some other electronic file transfer system. Other uses for the parsed file 432 are contemplated, and thus the embodiments described with respect to FIG. 4 do not necessarily limit the claims or the other examples described herein.

FIG. 5 is a block diagram illustrating another example of multi-stage document classification of a source file having multiple documents, in accordance with one or more embodiments. Process 500 is a more specific variation of process 400 of FIG. 4. Process 500 is a variation of method 300 of FIG. 3. Process 400 may be implemented by system 200 of FIG. 2. Process 400 may take as input the source file 100 of FIG. 1. Process 500 is a specific example to aid in understanding the one or more embodiments of the present disclosure, and thus does not necessarily limit the claims or the other embodiments disclosed herein.

Process 500 begins with taking the image file 502 as input. The image file contains two source documents, namely source document 504 and source document 506. Initially, these two source documents are indistinguishable by a computer, such as a computer 508. In this specific example, the image file 502 is a computerized scan of these two documents. In this specific example, source document 504 is a W-2 tax form and source document source document 506 is a 1099 tax form. However, before the multi-stage classification system is applied to the image file 502, the computer 508 cannot distinguish these form as such, even if OCR is applied to the image file 502 as a whole and just natural language processing applied. The reason is that the computer will confuse text from the different source documents and draw incorrect conclusions or no conclusions as to the nature of the two source documents.

In one or more embodiments, the computer 508 is programmed with a multi-stage classifier 510, such as a multi-stage classifier 226 of FIG. 2. The multi-stage classifier 510 includes a first classifier 512, which may be a convolutional neural network, as described above. The first classifier 512 analyzes the source file 502 and distinguishes source document 504 from source document 506. Thus, the first classifier 512 distinguishes between different documents, but does not identify or further classify these source documents. In other words, the first classifier identifies that source document 504 and source document 506 are different from each other, but not that they are W-2 and 1099 forms respectively.

The output of the first classifier 512 is the partially parsed filed 514. The partially parsed file 514 contains sub-image 516 (corresponding to source document 504) and sub-image 516 (corresponding to source document 506). Sub-image 515 contains identified source document 518 and sub-image 516 contains identified source document 520. An "identified source document" is, again, an area in an image, PDF, or video file (or some other file) which the computer recognizes contains a discrete, related set of information. In this example, each sub-image is an image or PDF that contains unrecognized text; that is, the computer cannot yet read or recognize text that a human would recognize within the sub-image. So, for this particular example, the computer knows that sub-image 515 contains the identified source document 518, but not that the identified source document 518 is a W-2 form.

In this example, a computer 508 then uses a multi-stage classifier 510 to perform another stage of classification using an optical character recognition classifier 522. The optical character recognition classifier 522 takes as input the partially parsed file 514 and performs optical character recognition on sub-image 515 and sub-image 516. The output of the optical character recognition classifier 522 is the partially parsed file 524. The partially parsed file 524 still has sub-image 515 with identified source document 518, but now also contains recognized text 526 which a computer can analyze as text. Likewise, the partially parsed file 524 has sub-image 516 with identified source document 520, but now also contains recognized text 528 which a computer can analyze as text. At this point, the computer still cannot distinguish that one identified source document is a W-2 form and the other is a 1099 form.

The computer 508 then uses a multi-stage classifier 510 to perform a second stage of classification using a second classifier 530. Note that, in other embodiments, the second classifier 530 could be recharacterized as a third classifier, with the optical character recognition classifier 522 being characterized as the second classifier. In either case, second classifier takes as input the partially parsed file 524 and performs a natural language processing (NLP) artificial intelligence algorithm in order to identify and label the types of identified source documents present in the partially parsed file 524. This NLP algorithm may be applied separately to each identified source document in order to increase the probability of correctly classifying a given source document. Stated differently, the second classifier 530 performs a NLP algorithm to specifically identify the identified source document 518 as a W-2 form and the identified source document 520 as a 1099 form.

The output of the second classifier 530 is the parsed file 532. The parsed file 532 likewise contains sub-image 515 and sub-image 516. However, now sub-image 515 is labeled and classified as the identified sub-type of document 534 (a W-2 form), which corresponds to the identified source document 518. The identified sub-type of document 534 retains recognized text 526. Likewise, sub-image 516 is labeled and classified as the identified sub-type of document 536 (a 1099 form), which corresponds to the identified source document 520. The identified sub-type of document 536 retains the recognized text 528.

At this point, the parsed file 532 is ready for further processing by other algorithms or processes. For example, the parsed file 532 (or just parts of the parsed file 532) may be provided to two different algorithms, one specialized for processing identified W-2 forms (the identified sub-type of document 534) and the other specialized for processing 1099 forms (identified sub-type of document 536). The parsed file 532 may be transmitted to external computers for further processing, or may be further processed within the computer which performs process 500. The parsed file 532 may also be stored on a non-transitory computer readable storage medium. Parsed file may also be transmitted via email or some other electronic file transfer system. Other uses for the parsed file 532 are contemplated, and thus the embodiments described with respect to FIG. 5 do not necessarily limit the claims or the other examples described herein.

Figure 6A:
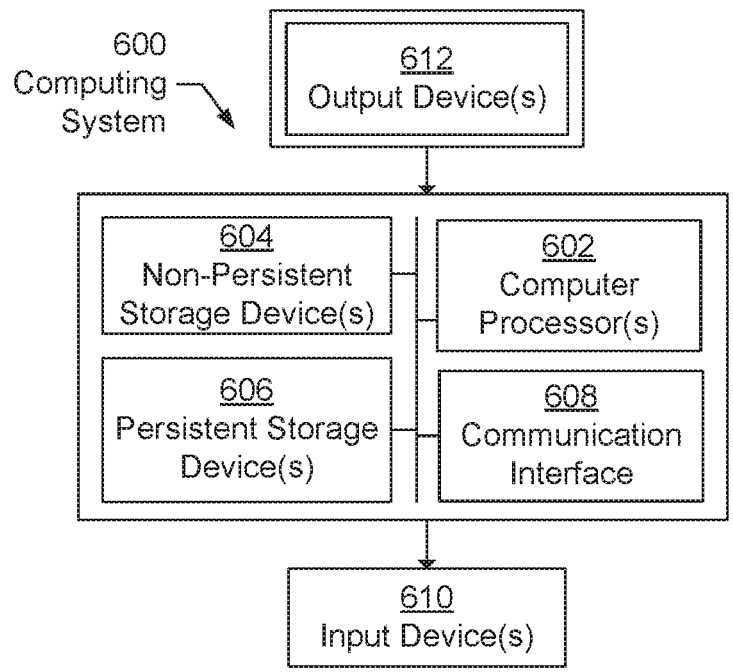
FIG. 6A is a diagram showing a computing system, in accordance with one or more embodiments of the disclosure.
Figure 6B:
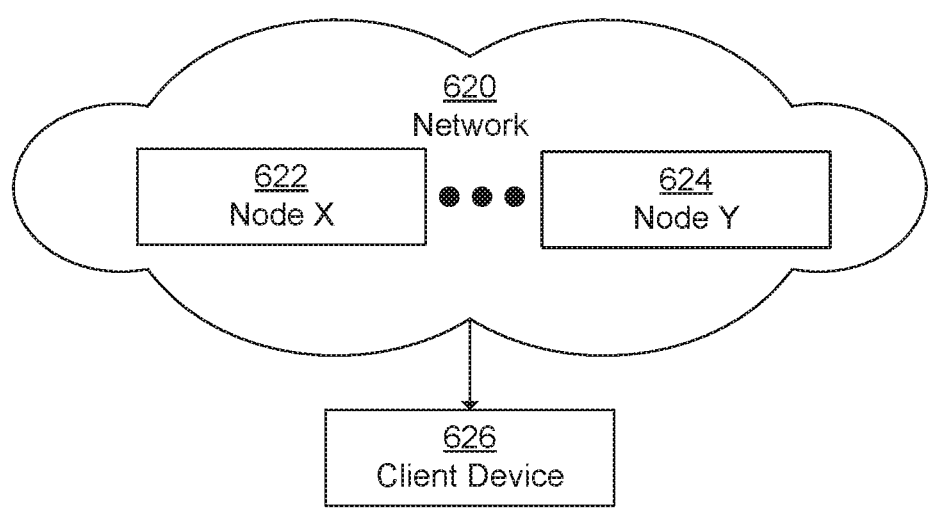
FIG. 6B is a diagram showing a computer network, in accordance with one or more embodiments of the disclosure.

Embodiments of the disclosure may be implemented on a computing system. Any combination of mobile, desktop, server, embedded, or other types of hardware may be used. FIG. 6A and FIG. 6B are diagrams showing a computing system, in accordance with one or more embodiments of the disclosure. As shown in FIG. 6A, the computing system 601 may include one or more computer processor(s) 602, associated memory 603 (e.g., random access memory (RAM), cache memory, flash memory, etc.), one or more storage device(s) 604 (e.g., a hard disk, an optical drive such as a compact disk (CD) drive or digital versatile disk (DVD) drive, a flash memory stick, etc.), and numerous other elements and functionalities such as communication interface 607. The computer processor(s) 602 may be an integrated circuit for processing instructions. For example, the computer processor(s) may be one or more cores, or microcores of a processor. The computing system 601 may also include one or more input device(s) 606, such as a touchscreen, keyboard, mouse, microphone, touchpad, electronic pen, or any other type of input device. Further, the computing system 601 may include one or more output device(s) 605, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 601 may be connected to a network 620 (e.g., a local area network (LAN), a wide area network (WAN) such as the Internet, mobile network, or any other type of network) via a network interface connection (not shown). The input and output device(s) may be locally or remotely (e.g., via the network 620) connected to the computer processor(s) 602, memory 603, and storage device(s) 604. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure.

Further, one or more elements of the aforementioned computing system 601 may be located at a remote location and connected to the other elements over a network 620.

Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

The computing system 600 in FIG. 6A may be connected to or be a part of a network. For example, as shown in FIG. 6B, the network 620 may include multiple nodes (e.g., node X 622, node Y 624). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 600 may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 622, node Y 624) in the network 620 may be configured to provide services for a client device 626. For example, the nodes may be part of a cloud computing system. The nodes may include functionality to receive requests from the client device 626 and transmit responses to the client device 626. The client device 626 may be a computing system, such as the computing system shown in FIG. 6A. Further, the client device 626 may include and/or perform all or a portion of one or more embodiments of the disclosure.

The computing system or group of computing systems described in FIG. 6A and FIG. 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 6A and the nodes and/or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving a source file containing a plurality of documents which, to a computer, initially are indistinguishable from each other;
    obtaining a parsed file comprising a plurality of identified sub-types of documents from the source file comprising the plurality of documents indistinguishable from each other, by:
        applying, by the computer, a first classification stage to the source file using a convolutional neural network image classification to identify source documents in the plurality of documents and to produce a partially parsed file having a plurality of identified source documents, the partially parsed file comprising sub-images corresponding to the plurality of identified source documents;
        applying, by the computer, a second classification stage, comprising a natural language processing artificial intelligence, to sets of text in bounding boxes of the sub-images, to classify each of the plurality of identified source documents as a corresponding sub-type of document, each of the sets of text corresponding to one of the sub-images, and to produce the parsed file having the plurality of identified sub-types of documents; and
    using the parsed file for further computer processing.

2. The method of claim 1, further comprising:
    transmitting the parsed file to a computer processing service.

3. The method of claim 2, further comprising:
    processing, by the computer processing service, each corresponding sub-type of document according to types of the sets of text contained in the sub-images.

4. The method of claim 1, further comprising:
    after applying the first classification stage, but before applying the second classification stage, applying an optical character recognition algorithm to each of the sub-images to produce the plurality of sets of text.

5. The method of claim 1, wherein using the parsed file comprises:
    transmitting the parsed file to a plurality of specialized tax preparation computer services.

6. The method of claim 5, further comprising:
    extracting form fields of each of the plurality of identified sub-types of documents based on the corresponding sub-type of document.

7. The method of claim 6, further comprising:
    exporting the form fields to corresponding ones of the different specialized tax preparation computer services.

8. The method of claim 7, further comprising:
    performing computerized tax preparation algorithms specific to individual tax entities using form fields corresponding to the individual tax entities.

9. The method of claim 1, wherein using comprises transmitting the parsed file to another algorithm executing on the computer.

10. The method of claim 1, wherein the source file comprises one of an image and a portable document file.

11. The method of claim 1, further comprising:
    applying the bounding boxes around the sub-images.

12. The method of claim 1, wherein using parsed file comprises performing, by the computer, at least one of storing the parsed file on a non-transitory computer readable storage medium, displaying the parsed file, and transmitting the parsed file to another computer.

13. A non-transitory computer readable storage medium storing instructions for a computer to classify a document, the instructions, when executed by a computer processor, comprising:
    program code for receiving a source file containing a plurality of documents which, to a computer, initially are indistinguishable from each other;
    program code for obtaining a parsed file comprising a plurality of identified sub-types of documents from the source file comprising the plurality of documents indistinguishable from each other, by:
        applying a first classification stage to the source file using a vision-based convolutional neural network image classification to identify source documents in the plurality of documents, and to produce a partially parsed file having a plurality of identified source documents, the partially parsed file being composed of sub-images corresponding to the plurality of identified source documents;
    program code for applying a second classification stage, comprising a natural language processing artificial intelligence, to sets of text in bounding boxes of the sub-images, to classify each of the plurality of identified source documents as a corresponding sub-type of document, each of the sets of text corresponding to one of the sub-images, and to produce the parsed file having the plurality of identified sub-types of documents; and
    program code for using the parsed file for further computer processing.

14. The non-transitory computer readable storage medium of claim 13, wherein the instructions further comprise:
    program code for, after applying the first classification stage, but before applying the second classification stage, applying an optical character recognition algorithm to each of the plurality of sub-images to produce the plurality of sets of text.

15. The non-transitory computer readable storage medium of claim 13, wherein the program code for using the parsed file comprises:
    program code for transmitting the parsed file to a plurality of specialized tax preparation computer services.

16. The non-transitory computer readable storage medium of claim 13, wherein the program code for applying the first classification stage further includes:
   program code for applying the bounding boxes around the plurality of sub-images.

17. A system comprising:
   a data storage device comprising a storage medium, the data storage device containing a plurality of source files, each of the plurality of source files having a corresponding plurality of source documents, each of the plurality of source documents which to a computer, initially are indistinguishable from each other; and
   a computer programmed with a multi-stage classifier configured to obtain a parsed file comprising a plurality of identified sub-types of documents from one source file of the plurality of source files, the computer comprising:
      a first classifier configured to identify each of the plurality of source documents as a corresponding plurality of sub-images by applying a vision-based convolutional neural network to each of the plurality of source files, each of the plurality of sub-images corresponding to one of the plurality of source documents, wherein the first classifier is thereby configured to produce a partially parsed file, and
      a second classifier configured to identify a plurality sub-types of documents by applying a natural language processing artificial intelligence process to the corresponding plurality of sub-images, wherein the second classifier is thereby configured to produce the parsed file having the plurality of identified sub-types of documents having corresponding sets of text,
      wherein the computer is further programmed with a computer processing service configured to further sort the sub-types of documents into different kinds of sub-types of documents, and then process the sets of text according to the different kinds of sub-types of documents.

18. The system of claim 17, further comprising:
   an optical character recognition classifier configured to identify the sets of text in the plurality of sub-images.

19. The system of claim 17, wherein the first classifier is further configured to apply bounding boxes around each of the plurality of sub-images.

20. The system of claim 17, wherein the plurality of source documents are tax forms, wherein sub-types of documents are specific tax forms, and wherein the kinds of sub-types of documents are groups of specific tax forms having identical sub-types.

21. The system of claim 20, wherein the computer processing service is configured to automatically perform computerized tax preparation services on the sets of text.

22. The system of claim 17, wherein the computer processing service is further configured to perform at least one from a group consisting of storing the parsed file on a non-transitory computer readable storage medium, displaying the parsed file, and transmitting the parsed file to another computer.

* * * * *